C. Taylor.
Mower.

No 13.143   Patented June 26. 1855.

UNITED STATES PATENT OFFICE.

CHARLES TAYLOR, OF McKEESPORT, PENNSYLVANIA.

IMPROVEMENT IN MACHINES FOR CUTTING GRAIN, GRASS, &c.

Specification forming part of Letters Patent No. 13,143, dated June 26, 1855.

*To all whom it may concern:*

Be it known that I, CHARLES TAYLOR, of McKeesport, in the county of Allegheny and State of Pennsylvania, have invented a certain new and Improved Machine for Mowing Grass and Reaping Grain; and I do hereby declare that the following is a full, clear, and exact description thereof, reference being had to the annexed drawings, forming part of this specification, in which—

Figure 2:
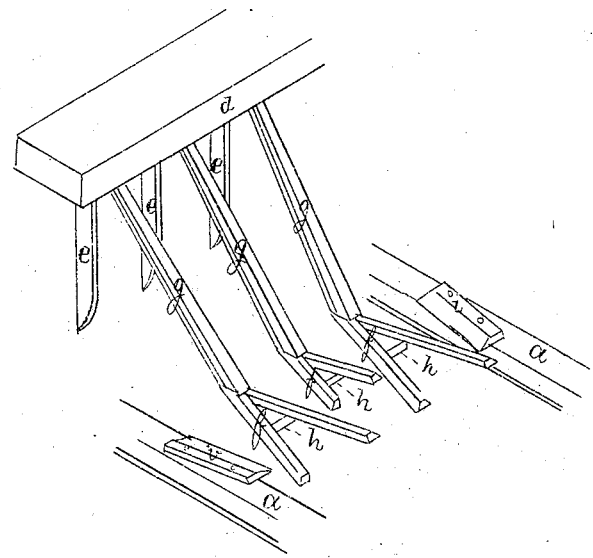
Figure 1:
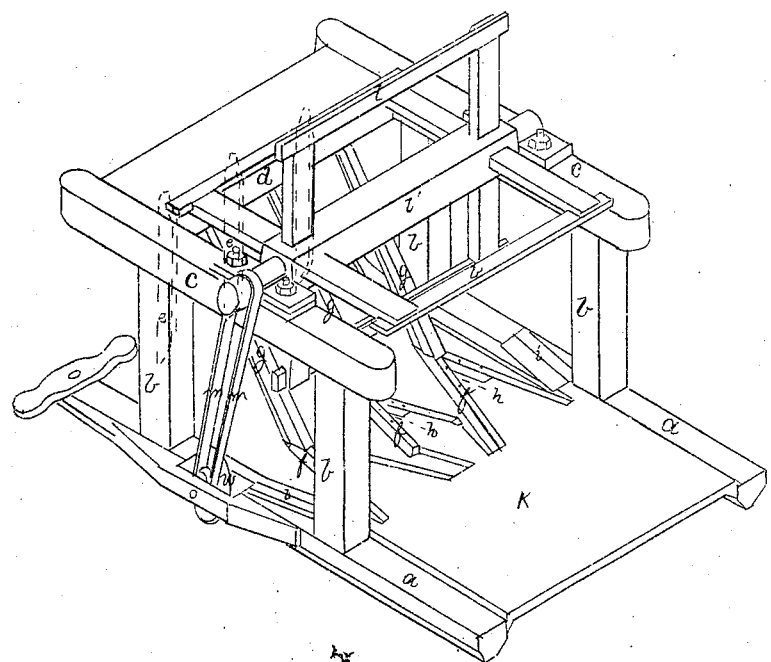

Figure 1 is a perspective view of my improved reaping-machine. Fig. 2 is a perspective view of the cutters $f f$, perpendicular rods $e e$, &c., and braces $g g$, &c., detached from the machine.

My machine consists in the use of a series of knives or cutters connected with the framework of the machine at their point, but not connected with the machine or with each other at their heel, and removable at pleasure, by means of which arrangement their sharp cutters may be employed, which, being supported at their points, have sufficient firmness, and being disconnected at their heel have sufficient elasticity to perform their functions with certainty, and without danger of the machine becoming choked or impeded in its progress.

In the drawings, $a a$ are the runners of the sled on which the machine is supported.

$b b$, &c., are four uprights supporting the beams $c c$ and the cross-beam $d$. From the cross-beam $d$ depend a number of perpendicular rods, $e e$, &c., the points of which reach down nearly as low as the level of the cutters. These rods are wedge-shaped in their transverse section, with the apex of the wedge toward the grass or grain, and prepare the way for the cutters.

The cutters $f f$, &c., are placed at a little distance back of the points of the rods $e e$, &c., and are supported and connected with the cross-beam $d$ by the bracess $g g$, one end of each of which is attached to the cross-beam $d$, immediately behind the point of connection of the perpendicular rods $e e$, &c. The lower end of each brace $g$ is attached to the upper surface of the block which carries the cutters. The braces $g g$, &c., are inclined at an angle of about sixty degrees with the horizon. The cutter-blocks $h h$ at the lower extremity of the braces $g g$ are of iron, and to them are attached by screws cutters or knives $f f$. These are of steel, and are long, with culterine edges.

Two of these cutters are placed on each cutter-block $h$, so as to converge and come to a point at the extremity of the braces $g g$, &c. Each alternate pair of cutters is longer than the other, so that, as the cutters do not come in contact at their heel or rear extremity, if any grass or grain passes between the cutters without being cut it will not escape the projecting ends of the longer cutters, which pass behind the point where the heels of the cutters approach nearest to contact. As these cutters are merely attached to their cutter-blocks by screws they may be readily removed in case they need sharpening or replacing. Short cutters $i i$ are placed one on each runner $a a$, projecting out at an angle toward the outside cutters, $f f$.

In cutting grass it falls down to the ground between the cutters, which prevents their choking; but in reaping grain it is necessary to save it, and an apron, $k$, fits on the runners $a a$, back of the cutters, filling up the whole space back of the cutters, thus preserving the grain. The fan-wheel $l$ is supported on the beams $c c$, and is so placed as that when it revolves it forces the grass or grain against the cutters and aids them in cutting the grain. The motion of this fan-wheel is obtained by a belt, $m$, running over a drum at the extremity of the shaft or axis $l'$ of the fan-wheel, and thence over a drum attached to the wheel $w$, fixed in the side of one of the runners $a$, and which rests on the ground and moves as the machine is drawn along.

It is almost needless further to describe the operation of my machine. The mode in which the cutters are attached to the machine is such that the greatest firmness and strength are given to that part which first enters the grain or grass, and which most needs to be sustained. The rear end of the cutters being unconnected with the machine gives an elasticity or spring to the cutters, which enables them to meet any unusual resistance without breaking. The fact of their being disconnected with each other at the rear end prevents the choking and clogging of the machine, while the longer cutters, extending behind the rear end of the shorter ones, cuts down any straggling grass or grain which may have slipped through past the short cutters.

Having thus described my improved grain and grass reaping machine, what I claim as my invention, and desire to secure by Letters Patent, is—

The use of a series of knives or cutters connected with the frame of the machine at the point or angle formed by the connection of each pair of cutters, but not connected with the machine or with each other at the heel, and removable at pleasure, substantially in the manner and for the purposes aforesaid.

CHARLES TAYLOR.

Witnesses:
  WM. N. HOWARD,
  N. BUCKMASTER.